(12) United States Patent
Morita (10) Patent No.: US 11,694,849 B2
(45) Date of Patent: *Jul. 4, 2023

(54) CERAMIC ELECTRONIC DEVICE

(71) Applicant: TAIYO YUDEN CO., LTD., Tokyo (JP)

(72) Inventor: Koichiro Morita, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/855,074

(22) Filed: Jun. 30, 2022

(65) Prior Publication Data

US 2022/0336154 A1 Oct. 20, 2022

Related U.S. Application Data

(63) Continuation of application No. 16/859,669, filed on Apr. 27, 2020, now Pat. No. 11,410,817.

(30) Foreign Application Priority Data

May 8, 2019 (JP) .................................. 2019-088626

(51) Int. Cl.
  *H01G 4/30* (2006.01)
  *H01G 4/12* (2006.01)
  (Continued)

(52) U.S. Cl.
  CPC ............ *H01G 4/30* (2013.01); *C04B 35/4682* (2013.01); *H01G 4/012* (2013.01); *H01G 4/1218* (2013.01);
  (Continued)

(58) Field of Classification Search
  CPC ........ H01G 4/30; H01G 4/012; H01G 4/1218; H01G 4/1227; C04B 35/4682
  (Continued)

(56) References Cited

U.S. PATENT DOCUMENTS

| | | | |
|---|---|---|---|
| 6,243,254 B1* | 6/2001 | Wada | H01G 4/1227 361/321.5 |
| 2002/0074154 A1* | 6/2002 | Kim | H01G 4/1227 174/137 B |

(Continued)

FOREIGN PATENT DOCUMENTS

| | | |
|---|---|---|
| JP | 2004356305 A | 12/2004 |
| JP | 2014165447 A | 9/2014 |
| WO | 2010047181 A1 | 4/2010 |

OTHER PUBLICATIONS

Xiafang Chen, Xiaolian Chao, Zupei Yang; "Submicron barium calcium zirconium titanate ceramic for energy storage synthesised via the co-precipitation method"; Mar. 2019; ScienceDirect; vol. 111 (Year: 2019).*

(Continued)

*Primary Examiner* — Arun Ramaswamy
(74) *Attorney, Agent, or Firm* — Law Office of Katsuhiro Arai (57) ABSTRACT

A multilayer ceramic capacitor includes: a multilayer structure in which each of dielectric layers and each of internal electrode layers are stacked, wherein a relationship of $8.0 \geq I_A/I_B > 1.40$ is satisfied in a TSDC (Thermally Stimulated Depolarization Currents) of temperature elevation rate of 10 degrees C./min under a condition of 130 degrees C., 5 V/μm and a polarization of 30 min, when a peak current value on a lower temperature side in a temperature range of 130

(Continued)

degrees C. to 190 degrees C. is $I_A$ and a peak current value on a higher temperature side in a temperature range of 190 degrees C. to 280 degrees C. is $I_B$.

20 Claims, 5 Drawing Sheets

(51) Int. Cl.
  *H01G 4/012* (2006.01)
  *C04B 35/468* (2006.01)
(52) U.S. Cl.
  CPC ..... *H01G 4/1227* (2013.01); *C04B 2235/783* (2013.01)
(58) Field of Classification Search
  USPC ............. 361/301.4, 321.1, 321.5, 311, 312
  See application file for complete search history.

(56) References Cited

U.S. PATENT DOCUMENTS

| | | | |
|---|---|---|---|
| 2010/0118467 A1* | 5/2010 | Takeuchi | H01G 4/232 361/306.3 |
| 2011/0205687 A1 | 8/2011 | Inoue et al. | |
| 2012/0147517 A1* | 6/2012 | Hur | H01G 4/30 29/25.42 |
| 2017/0316883 A1* | 11/2017 | Yamaguchi | B32B 18/00 |

OTHER PUBLICATIONS

Chazono et al., dc-Electrical Degradation of the BT-Based Material for Multilayer Ceramic Capacitor with Ni internal Electrode: Impedance Analysis and Microstructure, Jpn J Appl Phys, vol. 40, Sep. 2001, pp. 5624-5629 (6 pages).
Huan et al, Defect Engineering of high-performance Potassium Sodium Niobate Piezoelectric Ceramics Sintered in Reducing Atmosphere, 2017, The American Ceramic Society, vol. 100 No.5, pp. 2024-2033 (10 pages).
Notice of Allowance issued by U.S Patent and Trademark Office, dated Apr. 7, 2022, for related U.S. Appl. No. 16/859,669 (13 pages).
Takeoka et al., Thermally Stimulated Current (TSC) Studies on Resistance Degradation if Ni-MLCC, Ferroelecttrics, 356, 2007, pp78-84 (7 pages).
Zhang et al, Polarization Response and Thermally Stimulated Depolarization Current of BaTiO3-based Y5V Ceramic Multilayer Capacitors, 2014; The American Ceramic Society, vol. 97 No.9, pp. 2921-2927 (7 pages).
A Notice of Reasons for Refusal issued by the Japanese Patent Office, dated May 9, 2023, for Japanese counterpart application No. 2019-088626. (3 pages).

\* cited by examiner

FIG. 5

CERAMIC ELECTRONIC DEVICE

CROSS-REFERENCE TO RELATED APPLICATION

This application is a continuation of U.S. patent application Ser. No. 16/859,669, filed on Apr. 27, 2020, which is based upon and claims the benefit of priority of the prior Japanese Patent Application No. 2019-088626, filed on May 8, 2019, the entire contents of which are incorporated herein by reference. The applicant herein explicitly rescinds and retracts any prior disclaimers or disavowals or any amendment/statement otherwise limiting claim scope made in any parent, child or related prosecution history with regard to any subject matter supported by the present application.

FIELD

A certain aspect of the present invention relates to a ceramic electronic device.

BACKGROUND

There is a report in which an insulation degradation occurs when oxygen defects in a dielectric layer are accumulated near a cathode because of electric field and an electrical resistance in an interface between the cathode and the dielectric layer is reduced in a ceramic electronic device such as a multilayer ceramic capacitor, and a time until the accumulation determines a lifetime of the ceramic electronic device (for example, see "dc-Electrical Degradation of the BT-Based Material for Multilayer Ceramic Capacitor with Ni internal Electrode: Impedance Analysis and Microstructure, Jpn J Appl Phys, Vol. 40 (2001) pp. 5624-5629").

There is disclosed a technology in which reliability such as the lifetime or resistance to voltage can be improved by reducing an amount of the oxygen defects (for example, see Japanese Patent Application Publication No. 2004-356305 hereinafter referred to as Document 1). In Document 1, a concentration of the oxygen defects is quantified with use of a TSDC (Thermally Stimulated Depolarization Currents).

SUMMARY OF THE INVENTION

In Document 1, the amount of the oxygen defects is estimated from an integral value of a current of the TSDC data. However, it is a part of the oxygen defects moving to the cathode over a crystal grain boundary of the dielectric layer that largely influences on the lifetime of the ceramic electronic device. Document 1 fails to disclose the fact.

The present invention has a purpose of providing a ceramic electronic device that is capable of improving reliability.

According to an aspect of the present invention, there is provided a ceramic electronic device including: a multilayer structure in which each of dielectric layers and each of internal electrode layers are alternately stacked, a main component of the dielectric layers being ceramic, wherein a relationship of $I_A/I_B > 1.40$ is satisfied in a TSDC (Thermally Stimulated Depolarization Currents) of temperature elevation rate of 10 degrees C./min under a condition of 130 degrees C., 5 V/μm and a polarization of 30 min, when a peak current value on a lower temperature side in a temperature range of 130 degrees C. to 190 degrees C. is $I_A$ and a peak current value on a higher temperature side in a temperature range of 190 degrees C. to 280 degrees C. is $I_B$.

DETAILED DESCRIPTION

A description will be given of an embodiment with reference to the accompanying drawings.

Figure 1:
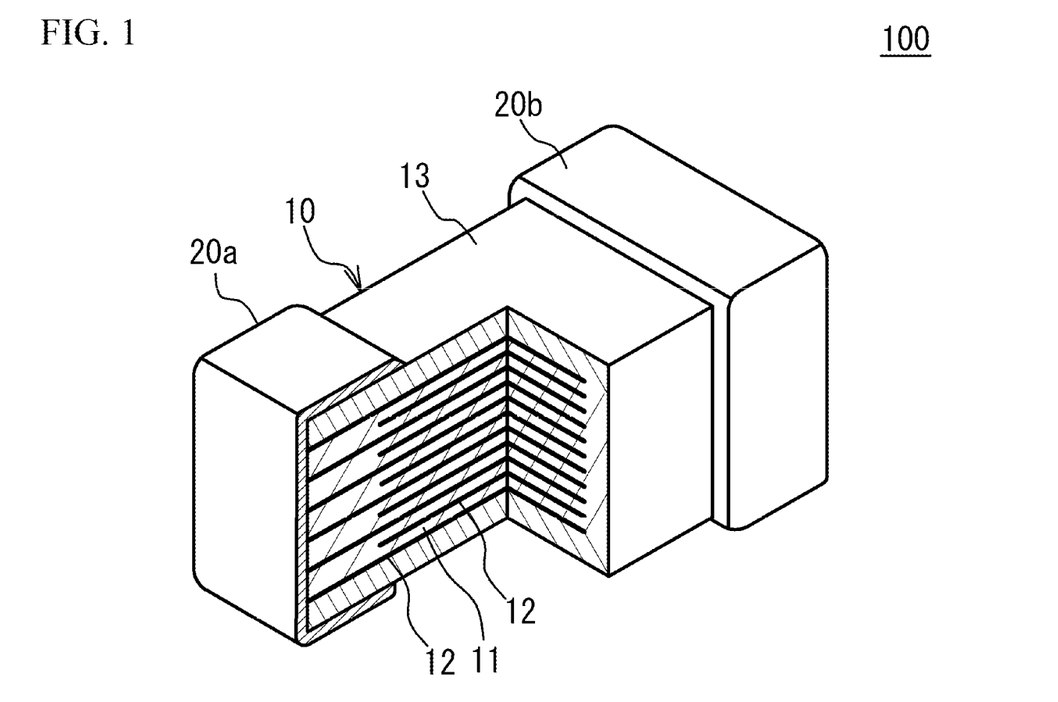
FIG. 1 illustrates a perspective view of a multilayer ceramic capacitor in which a cross section of a part of the multilayer ceramic capacitor is illustrated.

(Embodiment) A description will be given of an outline of a multilayer ceramic capacitor. FIG. 1 illustrates a perspective view of a multilayer ceramic capacitor 100 in accordance with an embodiment, in which a cross section of a part of the multilayer ceramic capacitor 100 is illustrated. As illustrated in FIG. 1, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, the internal electrode layer 12 is positioned at an outermost layer. The upper face and the lower face of the multilayer chip 10 that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof.

The dielectric layers 11 are mainly composed of a ceramic material that is expressed by a general formula $ABO_3$ and has a perovskite structure. The perovskite structure includes $ABO_{3-a}$, having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. For example, the dielectric layers 11 are formed by firing ceramic raw material powder of which a main component is a ceramic material having a perovskite structure.

In the multilayer ceramic capacitor 100, the insulation degradation occurs, when the oxygen defects in the dielectric layer 11 are accumulated in an interface between the internal electrode layer 12 and the dielectric layer 11 because of the electrical field of the internal electrode layer 12 acting as a cathode and reduces the electrical resistance in the interface. There is a report that a time until the accumulation determines the lifetime. The report is accepted widely. It is known that the reliability such as the lifetime or resistance to voltage can be improved when the amount of the oxygen defects is reduced in accordance with the model. For example, it is possible to estimate a movement amount of the oxygen defects by TSDC (Thermal Stimulation Depolarization Current).

Figure 2A:
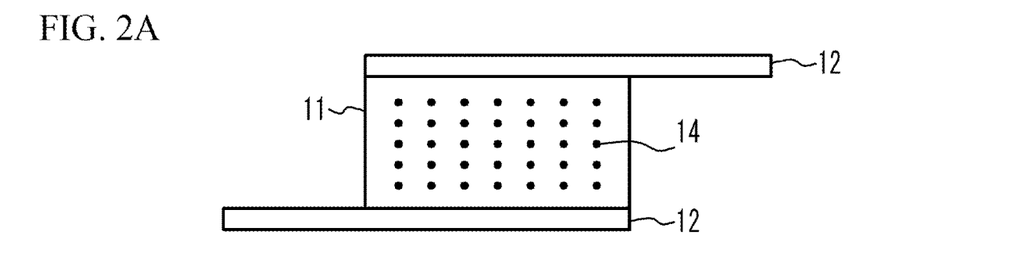
FIG. 2A to FIG. 2E illustrate a method of estimation of a movement amount of oxygen defects by using a TSDC.

For example, FIG. 2A to FIG. 2E illustrate a method for estimating the movement amount of the oxygen defect with use of the TSDC. FIG. 2A illustrates a cross sectional view of the dielectric layer 11 sandwiched by the internal electrode layer 12 connected to one of the external electrodes and the internal electrode layer 12 connected to the other of the external electrodes. As illustrated in FIG. 2A, oxygen defects 14 exist in the dielectric layers 11. For example, the oxygen defects 14 are evenly distributed in the dielectric layers 11.

Figure 2B:
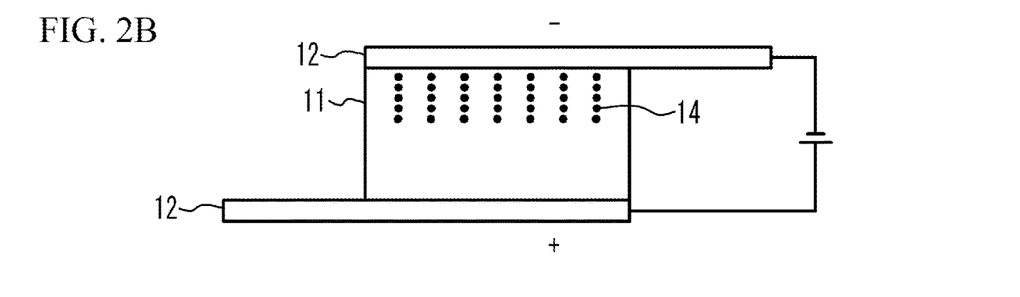

FIG. 2B partially illustrates the multilayer ceramic capacitor 100 in which a direct current voltage is applied to a part between the two internal electrode layers 12 next to each other and the part is heated. The oxygen defects 14 distributed evenly in the dielectric layer 11 are unevenly distributed on the side of one of the internal electrode layers 12 (minus electrode side in FIG. 2B), when the unloaded multilayer ceramic capacitor 100 is heated and the direct current voltage is applied between the two internal electrode layers 12 next to each other. In this case, the temperature is, for example, 200 degrees C. The electric field strength applied to the dielectric layer 11 is, for example, 10 V/μm.

Figure 2C:
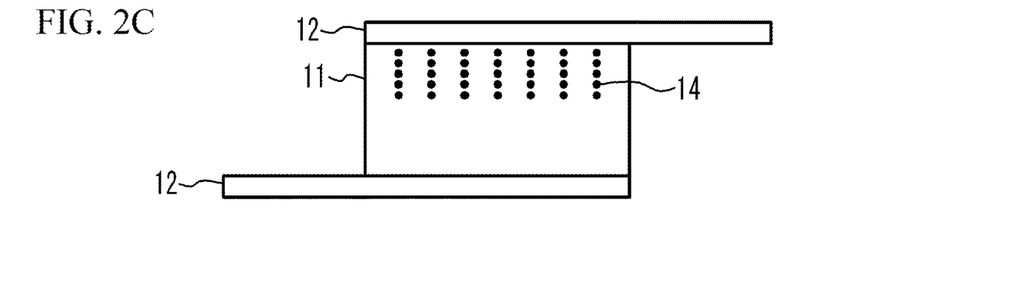

FIG. 2C illustrates a case where the condition of the multilayer ceramic capacitor 100 under a high temperature load is returned to the unloaded condition at a room temperature (25 degrees C.). Even if the voltage is canceled after the temperature is returned to the room temperature (25 degrees C.), the oxygen defects 14 are still unevenly distributed on the side of the one (the minus electrode side).

Figure 2D:
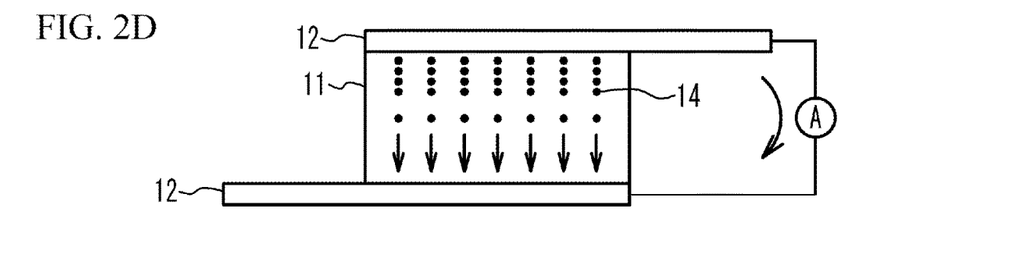
Figure 2E:
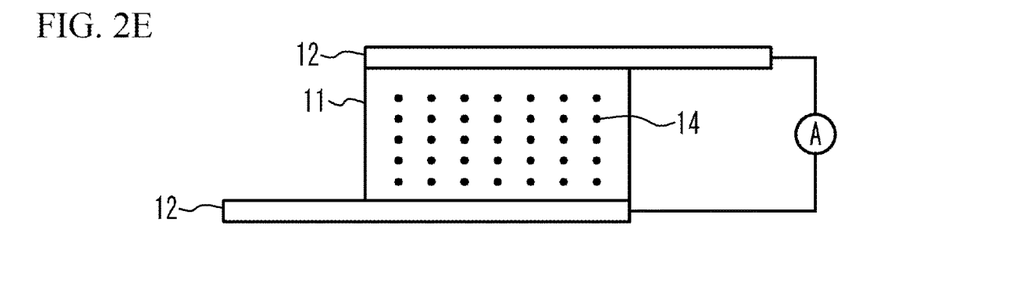

When the multilayer ceramic capacitor 100 is equipped with a current meter and the multilayer ceramic capacitor 100 is re-heated, the oxygen defects 14 unevenly distributed on the side of the one of the internal electrode layers 12 (the minus electrode side) in the dielectric layer 11 gradually moves toward the other of the internal electrode layers 12, as illustrated in FIG. 2D. The oxygen defects 14 act as carriers. Thus, a current flows. The current is called a thermally stimulated current. The temperature after the re-heating is approximately 300 degrees C. The thermally stimulated current occurs until the polarization caused by the oxygen defects 14 is canceled. Therefore, a time-integration of the current until the polarization is canceled is a total amount Q of the carrier charge in the dielectric layer 11.

The measured charge Q is divided by a charge per one oxygen defect 14 and the volume of the dielectric layer 11. Thus, the oxygen defect concentration in the multilayer ceramic capacitor 100 is calculated. The charge per one oxygen defect is $2 \times 1.6 \times 10^{-19}$ coulombs. An absolute value of the charge is expressed by $V_o^{+2}$ as a minus fixed charge. Therefore, an absolute value of the charge is twice as elementary electrical charge. In this manner, it is possible to estimate the amount of the oxygen defect from the integral of the current value.

Figure 3A:
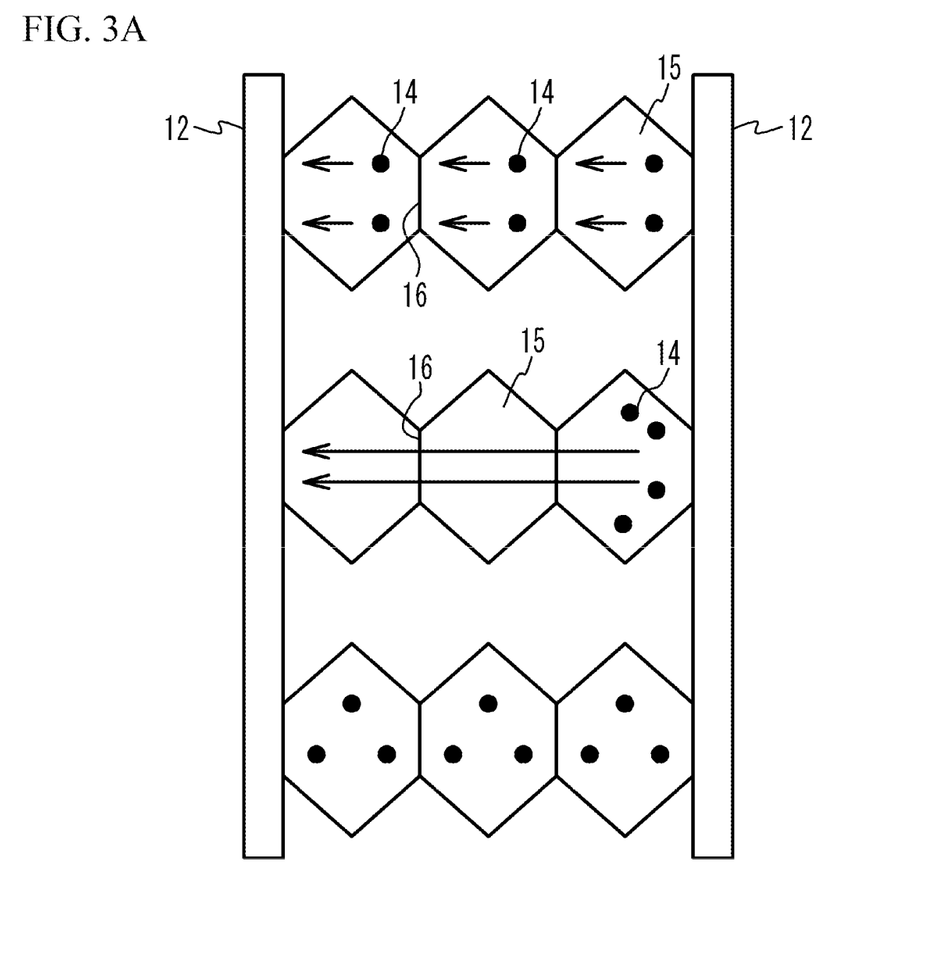
FIG. 3A illustrates movement of oxygen defects.

A description will be given of a moving of the oxygen defect during occurring of the thermal stimulation current. FIG. 3A illustrates the moving of the oxygen defect. As illustrated in FIG. 3A, the dielectric layer 11 includes a plurality of crystal grains 15. A crystal grain boundary 16 is formed between two of the crystal grains 15. As illustrated in an upper part of FIG. 3A, the oxygen defect 14 moves in the crystal grain 15. As illustrated in a middle part of FIG. 3A, the oxygen defect 14 crosses over the crystal grain boundary 16. The oxygen defect 14 crossing over the crystal grain boundary 16 of the dielectric layer 11 largely influences on the lifetime of the multilayer ceramic capacitor 100.

Figure 3B:
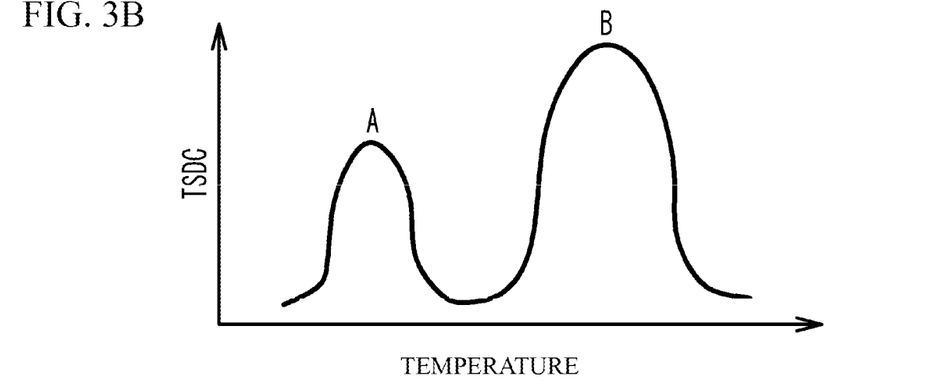
FIG. 3B illustrates a relationship between a temperature and a thermally stimulated current.

FIG. 3B illustrates a relationship between a temperature and the thermal stimulation current. As illustrated in FIG. 3B, a plurality of current peaks appear in the TSDC data. Two typical main peaks coarsely appear at a temperature of 130 degrees C. or more. One of the peaks is a low temperature side peak (peak A) of a temperature range of 130 degrees C. to 190 degrees C. and a high temperature side peak (peak B) of a temperature range of 190 degrees C. to 280 degrees C. In the method of FIG. 2A to FIG. 2E, the amount of the oxygen defect is estimated from an integrated value of the current peaks.

Only the integrated value does not associate actual reliability of the multilayer ceramic capacitor 100 with the TSDC data. This is because the oxygen defect 14 crossing over the crystal grain boundary 16 in the dielectric layer 11 largely influences on the reliability of the multilayer ceramic capacitor 100, as mentioned above. The current of the peak B indicates the moving of the oxygen defect 14 crossing over the crystal grain boundary 16. On the other hand, the current of the peak A indicates the oxygen defect which moves in the crystal grain 15 but does not cross over the crystal grain boundary 16. The influence of the peak A on the lifetime of the multilayer ceramic capacitor 100 is smaller than the influence of the peak B on the lifetime. Therefore, it is favorable that the peak B is small, from a viewpoint of improvement of the reliability.

Figure 4:
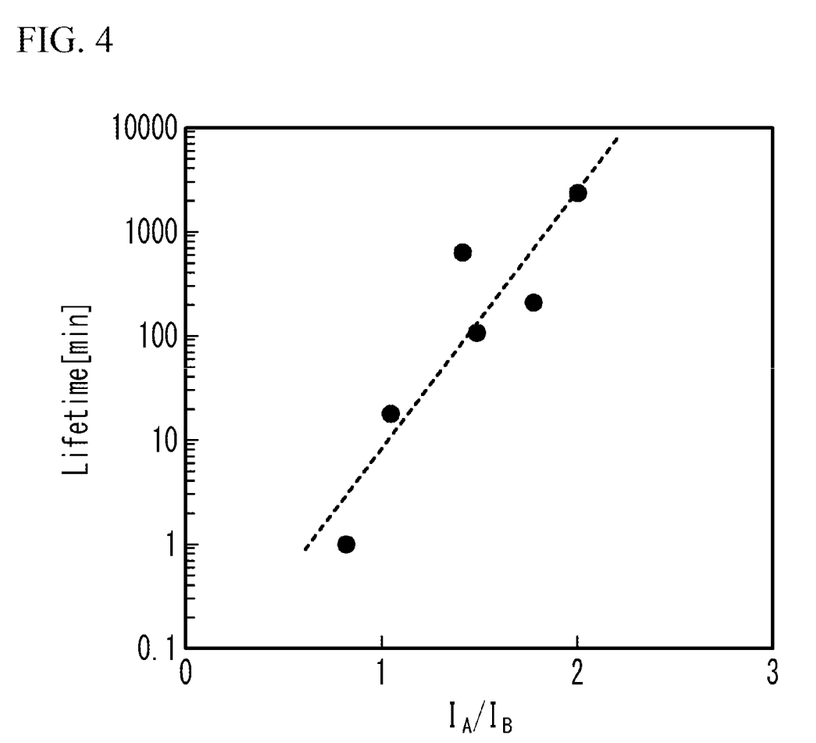
FIG. 4 illustrates results.

And so, the present inventor has found that a ratio of the current of the peak A with respect to the current of the peak B ($I_A/I_B$) is important for the controlling of the reliability. In concrete, the present inventor made a plurality of dielectric layers of which $I_A/I_B$ is different from each other in a TSDC of temperature elevation rate of 10 degrees C./min under a condition of 130 degrees C., 5 V/μm and a polarization of 30 min. The plurality of dielectric layers 11 were subjected to a HALT (Highly Accelerated limit Test) of a high temperature of 190 degrees C. and high electric field of 20 V/μm. FIG. 4 illustrates the results. As illustrated in FIG. 4, the present inventor has found that when $I_A/I_B>1.40$ is satisfied, it is possible to achieve a high lifetime of 100 min or more in a HALT (Highly Accelerated limit Test) of 190 degrees C. and 20 V/μm.

And so, in the multilayer ceramic capacitor 100 of the embodiment, $I_A/I_B$ of at least one of the dielectric layers 11 is more than 1.40. It is preferable that $I_A/I_B$ of all of the dielectric layers 11 in the multilayer ceramic capacitor 100 is more than 1.40.

For example, $I_A/I_B$ is more than 1.40 when parameters such as a composition of the dielectric layers 11, a crystal grain diameter of the dielectric layers 11, a firing condition of the dielectric layer 11, or the like are adjusted. From a view point of improvement of the reliability, it is preferable that $I_A/I_B$ is more than 2.0. It is more preferable that $I_A/I_B$ is more than 4.0.

For example, $I_A/I_B$ gets larger, when the number of crystal grain boundary crossing electrical field or a thickness of the crystal grain boundary is enlarged. However, when $I_A/I_B$ is excessively large, dielectric constant may be reduced. It is therefore preferable that $I_A/I_B$ has an upper limit, from a viewpoint of securing capacity and achieving high reliability. For example, it is preferable that $I_A/I_B$ is equal to or less than 8.0. It is more preferable that $I_A/I_B$ is 6.0 or less.

When the dielectric layers 11 include a plurality of crystal grains in the thickness direction, the peak A and the peak B remarkably appear. It is therefore preferable that the dielectric layers 11 include a plurality of crystal grains in the thickness direction. For example, it is preferable that an average number of the crystal grains per one of the dielectric layers 11 is 3 to 8. It is possible to calculate the average number of the crystal grains per one of the dielectric layers 11, by observing the cut cross of the dielectric layer 11 in parallel with the stacking direction by an electronic microscopy, counting the number of the crystal grains crossing an arbitral straight line in parallel with the stacking direction in one of the dielectric layers 11, repeating the counting in 20 dielectric layers 11 which are selected optionally, and calculating an average value.

For example, an average thickness of the dielectric layers is 3 μm or less. When the average thickness of the dielectric layers 11 is small, the number of the crystal grain boundary in a thickness direction is reduced. Therefore, when the average thickness of the dielectric layers 11 is small, it is important to regulate $I_A/I_B$. From this viewpoint, it is preferable that the average thickness of the dielectric layers 11 is 1 μm or less. It is preferable that the average thickness is 0.5 μm or less. It is preferable that the average thickness is 0.45 μm or less. And it is preferable that the average thickness is 0.35 μm or less. When a cut section in parallel with the stacking direction of the dielectric layers 11 is observed by an electron microscopy, it is possible to calculate the average thickness by calculating an average value of thicknesses of 20 points which are optionally selected.

The values themselves of $I_A$, $I_B$ and $(I_A+I_B)$ fluctuate in accordance with the size, the electrode structure, the thickness of the dielectric layers, the polarization condition, or other conditions of the multilayer ceramic capacitor 100. It is therefore difficult to control the lifetime of the multilayer ceramic capacitor 100, only with use of the values themselves. From the viewpoint, the embodiment focuses on the ratio of $I_A$ and $I_B$.

Figure 5:
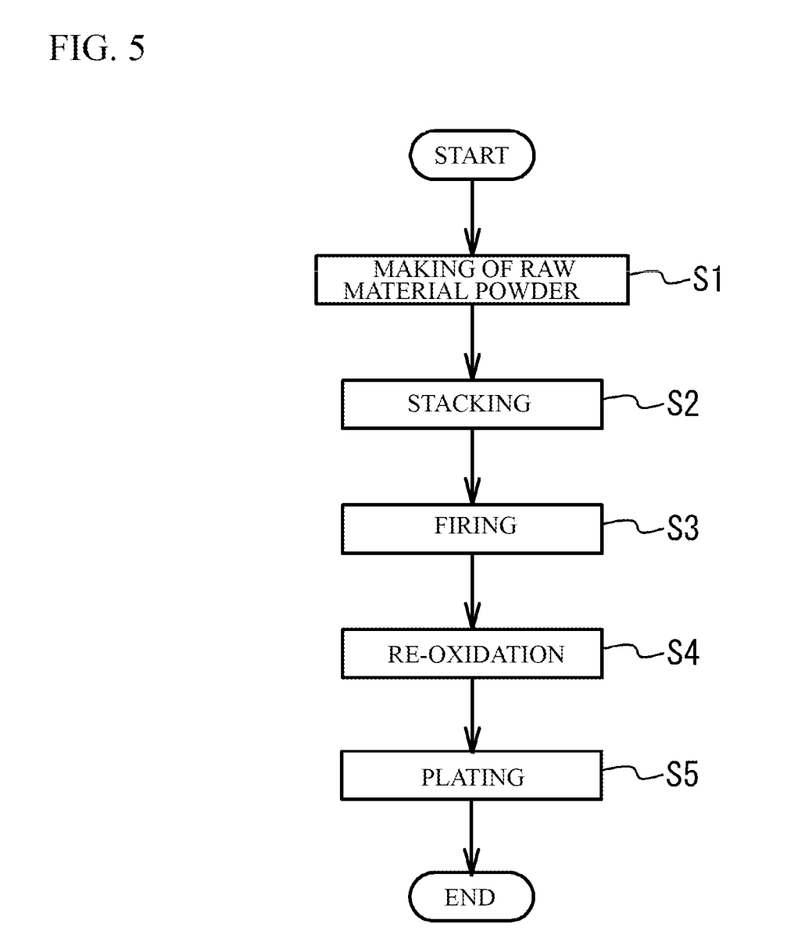
FIG. 5 illustrates a manufacturing method of a multilayer ceramic capacitor.

Next, a description will be given of a manufacturing method of the multilayer ceramic capacitor 100. FIG. 5 illustrates a manufacturing method of the multilayer ceramic capacitor 100.

(Making process of raw material powder) A dielectric material for forming the dielectric layer 11 is prepared, as illustrated in FIG. 5 Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to resulting ceramic powders, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si, or glass.

For example, the resulting ceramic raw material powder is wet-blended with additives and is dried and crushed. Thus, a ceramic material is obtained. For example, the grain diameter may be adjusted by crushing the resulting ceramic material as needed. Alternatively, the grain diameter of the resulting ceramic power may be adjusted by combining the crushing and classifying. With the processes, the ceramic material acting as a main component of the dielectric layers is obtained.

(Stacking process) Next, a binder such as polyvinyl butyral (PVB) resin, an organic solvent such as ethanol or toluene, and a plasticizer are added to the resulting dielectric material and wet-blended. With use of the resulting slurry, a base material is coated with a stripe-shaped dielectric green sheet with a thickness of 3 μm or less, for example, a die coater method or a doctor blade method, and then dried.

Then, a pattern of the internal electrode layer 12 is provided on the surface of the dielectric green sheet by printing metal conductive paste for forming an internal electrode with use of screen printing or gravure printing. The conductive paste includes an organic binder. A plurality of patterns are alternatively exposed to the pair of external electrodes. The metal conductive paste includes ceramic particles as a co-material. A main component of the ceramic particles is not limited. However, it is preferable that the main component of the ceramic particles is the same as that of the dielectric layer 11. For example, $BaTiO_3$ having an average grain diameter of 50 nm or less may be evenly dispersed.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of the external electrodes 20a and 20b of different polarizations. A cover sheet to be the cover layer 13 is clamped to an upper face of the stacked dielectric green sheets, and another cover sheet to be the cover layer 13 is clamped to a lower face of the stacked dielectric green sheets. The resulting stacked structure is stamped into a predetermined size (for example, 1.0 mm×0.5 mm).

After that, the binder is removed from the ceramic multilayer structure in $N_2$ atmosphere. After that, metal conductive paste for the external electrodes 20a and 20b is provided from the both end faces to the side faces of the ceramic multilayer structure and is dried. The metal conductive paste includes a metal filer, a co-material, a binder, a solvent and so on. The metal conductive paste is to be ground layers of the external electrodes 20a and 20b.

(Firing process) The binder is removed in $N_2$ atmosphere in a temperature range of 250 degrees C. to 500 degrees C. After that, the resulting compact is fired for 10 minutes to 2 hours in a reductive atmosphere having an oxygen partial pressure of $10^{-8}$ to $10^{-13}$ atm in a temperature range of 1100 degrees C. to 1300 degrees C. Thus, each compound is sintered. In this manner, the ceramic multilayer structure is obtained.

After that, the re-oxidation process is performed in $N_2$ gas atmosphere in a temperature range of 600 degrees C. to 1000 degrees C. For example, the re-oxidation process is performed for 1 hour at 950 degrees C. After that, in a cooling process, the atmosphere is switched from the $N_2$ gas atmosphere to ambient air at 400 degrees C. And the ceramic multilayer structure is cooled to a room temperature. With the processes, it is possible to enlarge the oxygen concentration of the crystal grain boundary 16 of the dielectric layers 11. It is therefore possible to suppress the movement of the oxygen defect 14 crossing over the crystal grain boundary 16 or along the crystal grain boundary 16. Accordingly, it is possible to relatively reduce $I_B$ with respect to $I_A$.

(Plating process) After that, with a plating process, ground layers of the external electrodes 20a and 20b are coated with a metal such as Cu, Ni, and Sn. With the processes, the multilayer ceramic capacitor 100 is manufactured.

In the manufacturing method of the embodiment, $I_A/I_B$ of at least one of the dielectric layers 11 is more than 1.40. It is therefore possible to achieve a long lifetime which is 100 min or more in a HALT (Highly Accelerated limit Test) at a high temperature of 190 degrees C. and at high electric field of 20 V/μm. When parameters of the dielectric layers 11 such as a composition of the dielectric layers 11, a crystal grain diameter of the dielectric layers 11 or a sintering condition of the dielectric layers 11 is adjusted, $I_A/I_B$ may be more than 1.40.

(Modified embodiment) An amount of $SiO_2$ added to the dielectric material may be adjusted. For example, in the dielectric material, a concentration of glass including $SiO_2$ or Si as a main component may be 2.0 atm % or more with respect to the main component ceramic. The atm % is expressed in a Si atomic concentration. In this case, an amount of $SiO_2$ or a glass phase which acts as a movement barrier of the oxygen defect is enlarged. And, $I_B$ can be relatively reduced with respect to $I_A$.

For example, in the dielectric material including $BaTiO_3$ having an average particle diameter of 200 nm as the main component ceramic, a concentration of Si may be 2.0 atm %; a concentration of Mg may be 1.0 atm %; a concentration of Ho may be 1.0 atm ; a concentration of Mn may be 0.5 atm %; and a concentration of V may be 0.1 atm %, with respect to 100 atm % of Ti. In this case, the thickness of the dielectric green sheet may be 5 μm. The number of the stacked dielectric green sheets may be 10. The size of the ceramic multilayer structure may be a length of 3.2 mm, a width of 1.6 mm and a height of 0.8 mm.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

Although the embodiments of the present invention have been described in detail, it is to be understood that the various change, substitutions, and alterations could be made hereto without departing from the spirit and scope of the invention.

The invention claimed is:

1. A multilayer ceramic capacitor comprising:
a multilayer structure in which each of dielectric layers and each of internal electrode layers are stacked,
wherein a relationship of $8.0 \geq I_A/I_B > 1.40$ is satisfied in a TSDC (Thermally Stimulated Depolarization Currents) of temperature elevation rate of 10 degrees C./min under a condition of 130 degrees C., 5 V/μm and a polarization of 30 min, when a peak current value on a lower temperature side in a temperature range of 130 degrees C. to 190 degrees C. is $I_A$ and a peak current value on a higher temperature side in a temperature range of 190 degrees C. to 280 degrees C. is $I_B$.

2. The multilayer ceramic capacitor as claimed in claim 1, wherein a relationship of $6.0 \geq I_A/I_B > 1.40$ is satisfied in the TSDC.

3. The multilayer ceramic capacitor as claimed in claim 1, wherein a relationship of $8.0 \geq I_A/I_B > 2.0$ is satisfied in the TSDC.

4. The multilayer ceramic capacitor as claimed in claim 1, wherein a relationship of $6.0 \geq I_A/I_B > 2.0$ is satisfied in the TSDC.

5. The multilayer ceramic capacitor as claimed in claim 1, wherein a relationship of $8.0 \geq I_A/I_B > 4.0$ is satisfied in the TSDC.

6. The multilayer ceramic capacitor as claimed in claim 1, wherein a relationship of $6.0 \geq I_A/I_B > 4.0$ is satisfied in the TSDC.

7. The multilayer ceramic capacitor as claimed in claim 1, wherein an average number of crystal grains of at least one of the dielectric layers is 3 to 8 in a thickness direction of the dielectric layers.

8. The multilayer ceramic capacitor as claimed in claim 1, wherein the multilayer ceramic capacitor has a length of 0.4 mm or less, a width of 0.2 mm or less, and a height of 0.2 mm or less.

9. The multilayer ceramic capacitor as claimed in claim 1, wherein the multilayer ceramic capacitor has a length of 0.6 mm or more and 1.0 mm or less, a width of 0.3 mm or more and 0.5 mm or less, and a height of 0.3 mm or more and 0.5 mm or less.

10. The multilayer ceramic capacitor as claimed in claim 1, wherein the multilayer ceramic capacitor has a length of 3.2 mm or more and 4.5 mm or less, a width of 1.6 mm or more and 3.2 mm or less, and a height of 1.6 mm or more and 2.5 mm or less.

11. The multilayer ceramic capacitor as claimed in claim 1,
wherein a main component of each of the internal electrode layers is Ni, and
wherein each of the internal electrode layers includes at least one of platinum, palladium, silver or gold.

12. The multilayer ceramic capacitor as claimed in claim 1, wherein a main component of each of the dielectric layers is $Ba_{1-x}Ca_xTiO_3$ (0<x<1).

13. The multilayer ceramic capacitor as claimed in claim 1, wherein a main component of each of the dielectric layers is $Ba_{1-x}Ca_xTi_{1-z}Zr_zO_3$ (0<x<1, 0<z<1).

14. The multilayer ceramic capacitor as claimed in claim 1, wherein an average thickness of the dielectric layers is 3 μm or less.

15. The multilayer ceramic capacitor as claimed in claim 1, wherein an average thickness of the dielectric layers is 1 μm or less.

16. The multilayer ceramic capacitor as claimed in claim 1, wherein an average thickness of the dielectric layers is 0.5 μm or less.

17. The ceramic electronic device as claimed in claim 1, wherein an average thickness of the dielectric layers is 0.45 μm or less.

18. The multilayer ceramic capacitor as claimed in claim 1, wherein an average thickness of the dielectric layers is 0.35 μm or less.

19. The multilayer ceramic capacitor as claimed in claim 1, wherein a number of the dielectric layers is 100 to 500.

20. The multilayer ceramic capacitor as claimed in claim 1,
wherein each of the dielectric layers includes Ti as a main component, and
wherein each of the dielectric layers includes Si of 2.0 atm % or more on a presumption that an amount of Ti is 100 atm %.

* * * * *